(12) United States Patent
Liu

(10) Patent No.: US 7,759,905 B2
(45) Date of Patent: Jul. 20, 2010

(54) LINEAR BATTERY CHARGER

(75) Inventor: Chih-Min Liu, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 695 days.

(21) Appl. No.: 11/758,711

(22) Filed: Jun. 6, 2007

(65) Prior Publication Data
US 2008/0054843 A1 Mar. 6, 2008

Related U.S. Application Data

(60) Provisional application No. 60/824,289, filed on Sep. 1, 2006.

(30) Foreign Application Priority Data

Jan. 8, 2007 (TW) .............................. 96100662 A

(51) Int. Cl.
*H02J 7/06* (2006.01)
*H02J 7/24* (2006.01)
(52) U.S. Cl. ...................................... 320/163; 320/162
(58) Field of Classification Search .................. 320/162, 320/163
See application file for complete search history.

(56) References Cited

U.S. PATENT DOCUMENTS

| 5,488,284 | A | 1/1996 | Dias |
| 6,194,875 | B1* | 2/2001 | Takimoto et al. ............ 320/164 |
| 2005/0212489 | A1* | 9/2005 | Denning et al. ............. 320/134 |
| 2006/0113966 | A1 | 6/2006 | Chen |

FOREIGN PATENT DOCUMENTS

| TW | 286367 | 9/1996 |
| TW | 467292 | 12/2001 |
| TW | 123181 | 4/2005 |
| TW | 200618439 | 6/2006 |

OTHER PUBLICATIONS

English abstract of TW 467292, pub. Dec. 1, 2001.
English abstract of TW 286367, pub. Sep. 21, 1996.
English abstract of TW I23181, pub. Apr. 11, 2005.
English abstract of TW 200618439, pub. Jun. 1, 2006.

* cited by examiner

*Primary Examiner*—Edward Tso
*Assistant Examiner*—Samuel Berhanu
(74) *Attorney, Agent, or Firm*—Thomas, Kayden, Horstemeyer & Risley

(57) ABSTRACT

A linear battery chargers is disclosed which comprises a current generator, a current detector, an operational amplifier, and a multiplexing device. The current generator provides current to charge a battery module, and the current is detected and transformed to a detected voltage by the current detector. The operational amplifier has an output terminal coupled to a control terminal of the current generator. In a constant current charge mode, the multiplexing device couples a first reference voltage and the detected voltage to first and second input terminals of the operational amplifier, respectively. The current generated by the current generator is maintained at a constant current level. In a constant voltage charge mode, the multiplexing device couples a second reference voltage and the voltage level of the battery module to the first and second input terminals of the operational amplifier, respectively. The voltage level of the battery module gradually approaches a constant voltage level.

8 Claims, 6 Drawing Sheets

LINEAR BATTERY CHARGER

CROSS REFERENCE TO RELATED APPLICATIONS

This application claims the benefit of U.S. Provisional Application No. 60/824,289, filed Sep. 1, 2006, which is incorporated herein by reference.

BACKGROUND OF THE INVENTION

1. Field of the Invention

The invention relates to linear battery chargers.

2. Description of the Related Art

Conventional linear battery chargers can be operated in constant current and constant voltage charge modes. Before reaching a rated voltage level, a battery module is charged by a constant current provided by a linear battery charger operating in the constant current charge mode. When the voltage level of the battery module ($V_{bat}$) reaches the rated voltage level, the linear battery charger switches to the constant voltage charge mode to charge the battery module to a desired voltage level. For example, to charge a lithium battery having a desired voltage level of 4.2V, the linear battery charger begins operating in a constant current charge mode to charge the lithium battery to a rated voltage level of 4.1V and then switches to a constant voltage charge mode to charge the lithium battery to the desired voltage level, 4.2V. When the linear battery charger is operated in the constant voltage charge mode, the lithium battery is kept from overcharging, and the lifespan thereof extended accordingly.

FIG. 1 illustrates a conventional linear battery charger 100, comprising a charge transistor $g_{mp}$ charging a battery module 102. In a constant current charge mode, a first switch $SW_1$ is turned on and a second switch $SW_2$ is turned off. The loop comprising a first operational amplifier $OP_1$, a second operational amplifier $OP_2$, a transistor $g_{mnc}$ and the charge transistor $g_{mp}$ maintains current I through the current-sensing resistor $R_{sns}$ at a constant current level. The value of the constant current level is determined by a first reference voltage level $V_{ref1}$ coupled to the second operational amplifier $OP_2$. The linear battery module 100 further comprises a frequency compensation circuit comprising a capacitor $C_C$ and a resistor $R_C$ to compensate the undesired pole of the linear battery charger in the constant current charge mode.

In a constant voltage charge mode, the first switch $SW_1$ is turned off and a second switch $SW_2$ is turned on. The loop comprising a third operational amplifier $OP_3$, a transistor $g_{mnv}$ and the charge transistor $g_{mp}$ maintains the voltage level of the battery module ($V_{bat}$) at a second reference voltage $V_{ref2}$. The linear battery module 100 further comprises a frequency compensation circuit comprising a capacitor $C_Z$ and a resistor $R_Z$ to compensate the undesired pole of the linear battery charger in the constant voltage charge mode.

As shown in FIG. 1, to ensure the conventional linear battery charger 100 operates normally in the constant current and constant voltage charge modes, the operational amplifiers $OP_1$, $OP_2$, and $OP_3$ have to be accurate operational amplifiers (having low offset). The cost of the conventional linear battery charger 100 is very high. Furthermore, the frequency compensation circuits, especially the frequency compensation circuit comprising the capacitor $C_Z$ and resistor $R_Z$, is very large and occupies considerable chip area. Linear batteries that address such shortcomings are thus called for.

BRIEF SUMMARY OF THE INVENTION

Linear batteries are disclosed requiring less accurate operational amplifiers and correspondingly reduced size of frequency compensating circuits.

An embodiment of a linear battery charger comprises a current generator, a current detector, a first operational amplifier, and a multiplexing device. The current generator couples to a battery module and generates a first current to charge the battery module. The current detector is coupled to the current generator to detect the first current and generates a detected voltage according to the first current. The first operational amplifier has an output terminal coupled to a control terminal of the current generator. In a constant current charge mode, the multiplexing device couples a first reference voltage and the detected voltage to first and second input terminals of the first operational amplifier, respectively, to maintain the first current at a constant current level. In a constant voltage charge mode, the multiplexing device couples a second reference voltage and the voltage level of the battery module to the first and second input terminals of the first operational amplifier, respectively, to adjust the voltage level of the battery module to a constant voltage level.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
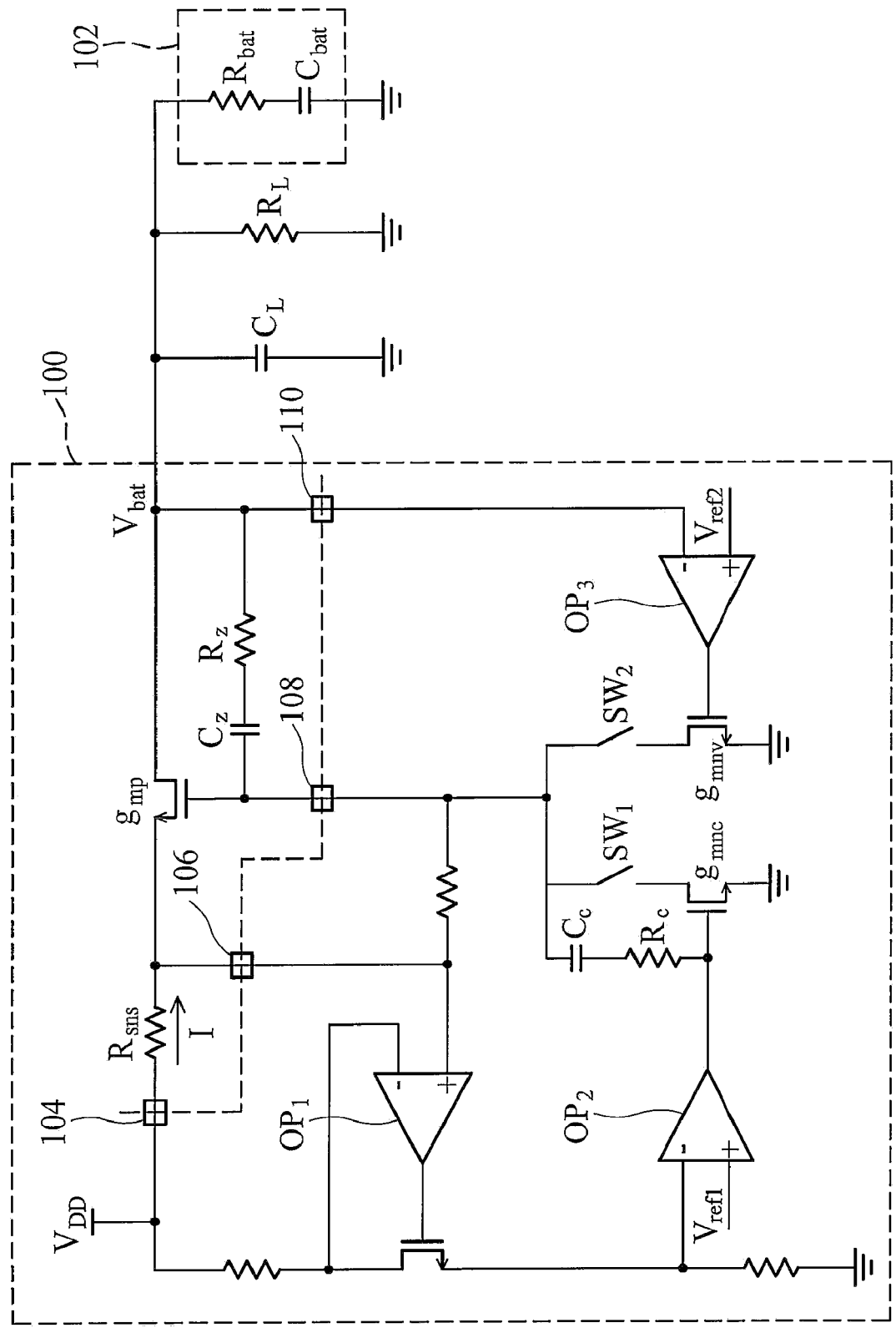
FIG. 1 illustrates a conventional linear battery charger.
Figure 2:
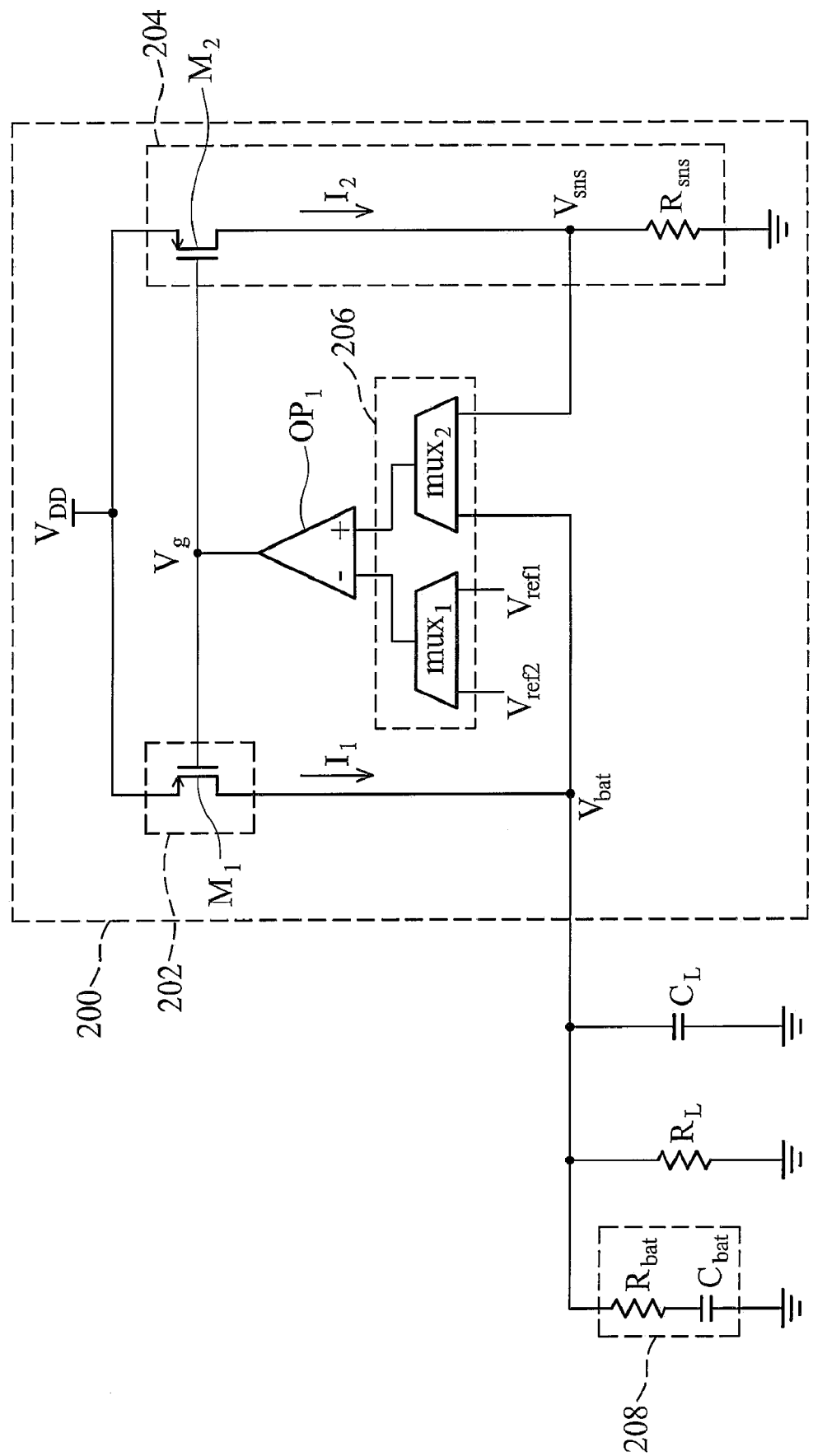
FIG. 2 illustrates an embodiment of the invention.

FIG. 2 illustrates an embodiment of the invention, wherein the linear battery charger 200 comprises a current generator 202, a current detector 204, a first operational amplifier $OP_1$, and a multiplexing device 206. The current generator 202 couples to a battery module 208 and generates a first current $I_1$ to charge the battery module 208. The current detector 204 is coupled to the current generator 202 and generates a detected voltage $V_{sns}$ varying with the first current $I_1$. The first operational amplifier $OP_1$ comprises a first input terminal (such as the inverting terminal), a second input terminal (such as the non-inverting terminal), and an output terminal. The output terminal of the first operational amplifier $OP_1$ is coupled to a control terminal of the current generator 202 to control the value of the first current $I_1$. In a constant current charge mode, the multiplexing device 260 couples a first reference voltage $V_{ref1}$ and the detected voltage $V_{sns}$ to the first and second input terminals of the first operational amplifier $OP_1$, respectively. In a constant voltage charge mode, the multiplexing device 206 couples a second reference voltage $V_{ref2}$ and the voltage level of the battery module ($V_{bat}$) to the first and second input terminals of the first operational amplifier $OP_1$, respectively.

In the embodiment shown in FIG. 2, the current generator 202 comprises a first Metal Oxide Semiconductor (MOS) transistor $M_1$. The first MOS transistor $M_1$ comprises a drain coupled to the battery module 208 and a gate coupled to the output terminal of the first operational amplifier $OP_1$. The gate of the first MOS transistor $M_1$ acts as a control terminal of the current generator 202. The current detector 204 comprises a second MOS transistor $M_2$ and a current-sensing resistor $R_{sns}$. The gate of the first MOS transistor $M_1$ further couples to the gate of the second MOS transistor $M_2$. The voltage difference between the source and gate of the first MOS transistor $M_1$ is the same as that of the second MOS transistor $M_2$. The second MOS transistor $M_2$ generates a second current 12. The first and second current $I_1$ and $I_2$ are at a ratio determined by the size of the first and second MOSs $M_1$ and $M_2$. The current-sensing resistor $R_{sns}$ is coupled to the drain of the second MOS transistor $M_2$ to transform the second current $I_2$ to the detected voltage $V_{sns}$. In some embodiments, the current-sensing resistor $R_{sns}$ is implemented as a variable resistor. The second MOS transistor $M_2$ is set to operate in a saturation region by controlling the value of the variable resistor.

As shown in FIG. 2, the multiplexing device 206 comprises a first multiplexer $mux_1$ and a second multiplexer $mux_2$. In the constant current charge mode, the multiplexer $mux_1$ couples the first reference voltage level $V_{ref1}$ to the inverting terminal of the first operational amplifier $OP_1$, and the second multiplexer $mux_2$ couples the detected voltage level $V_{sns}$ to the non-inverting terminal of the first operational amplifier $OP_1$. When the first current $I_1$ increases, the second current $I_2$ increases with the first current $I_1$ and the detected voltage level $V_{sns}$ increases with the second current $I_2$. In such a case, the first operational amplifier $OP_1$ increases the gate voltage of the first MOS transistor $M_1$ ($V_g$) when the detected voltage level $V_{sns}$ exceeds the first reference voltage $V_{ref1}$. The voltage difference between the source and gate of the first MOS transistor $M_1$ thus decreases and the first current $I_1$ decreases. Similarly, when the first current $I_1$ decreases, the control loop decreases the gate voltage of the first MOS transistor $M_1$, and the first current $I_1$ increases accordingly. Consequently, the first current $I_1$ is maintained at a constant current value.

In the constant voltage charge mode, the first multiplexer $mux_1$ couples the second reference voltage level $V_{ref2}$ to the inverting input terminal of the first operational amplifier $OP_1$, and the second multiplexer $mux_2$ couples the voltage level of the battery module ($V_{bat}$) to the non-inverting input terminal of the first operational amplifier $OP_1$. When the voltage level of the battery module ($V_{bat}$) is lower than the second reference voltage $V_{ref2}$, the first operational amplifier $OP_1$ decreases the value of $V_g$. Therefore, the first current $I_1$ is increased to charge the battery module 208 to the second reference voltage level $V_{ref2}$.

The first operational amplifier $OP_1$ is implemented by an accurate operational amplifier (having low offset). Compared to the conventional linear battery charger 100, the embodiment shown in FIG. 2 requires only one accurate operational amplifier. The invention thus reduces the cost and the size of the linear battery charger.

The invention further reduces the number of pins of the chip of the linear battery charger. For example, in FIG. 2, only the current-sensing resistor $R_{sns}$ is an external component. The other components of the linear battery charger 200 are fabricated inside the chip. Therefore, the chip of the battery charger 200 requires only three pins coupled to a voltage source $V_{DD}$, the battery module 208, and the current-sensing resistor $R_{sns}$, respectively. In the conventional linear battery charger 100, however, the current-sensing resistor $R_{sns}$, the charge transistor $g_{mp}$, the capacitor $C_Z$, and the resistor $R_Z$ are all external components. The chip of the conventional linear battery charger 100 requires at least four pins 104, 106, 108 and 110 to couple the external components.

Figure 3:
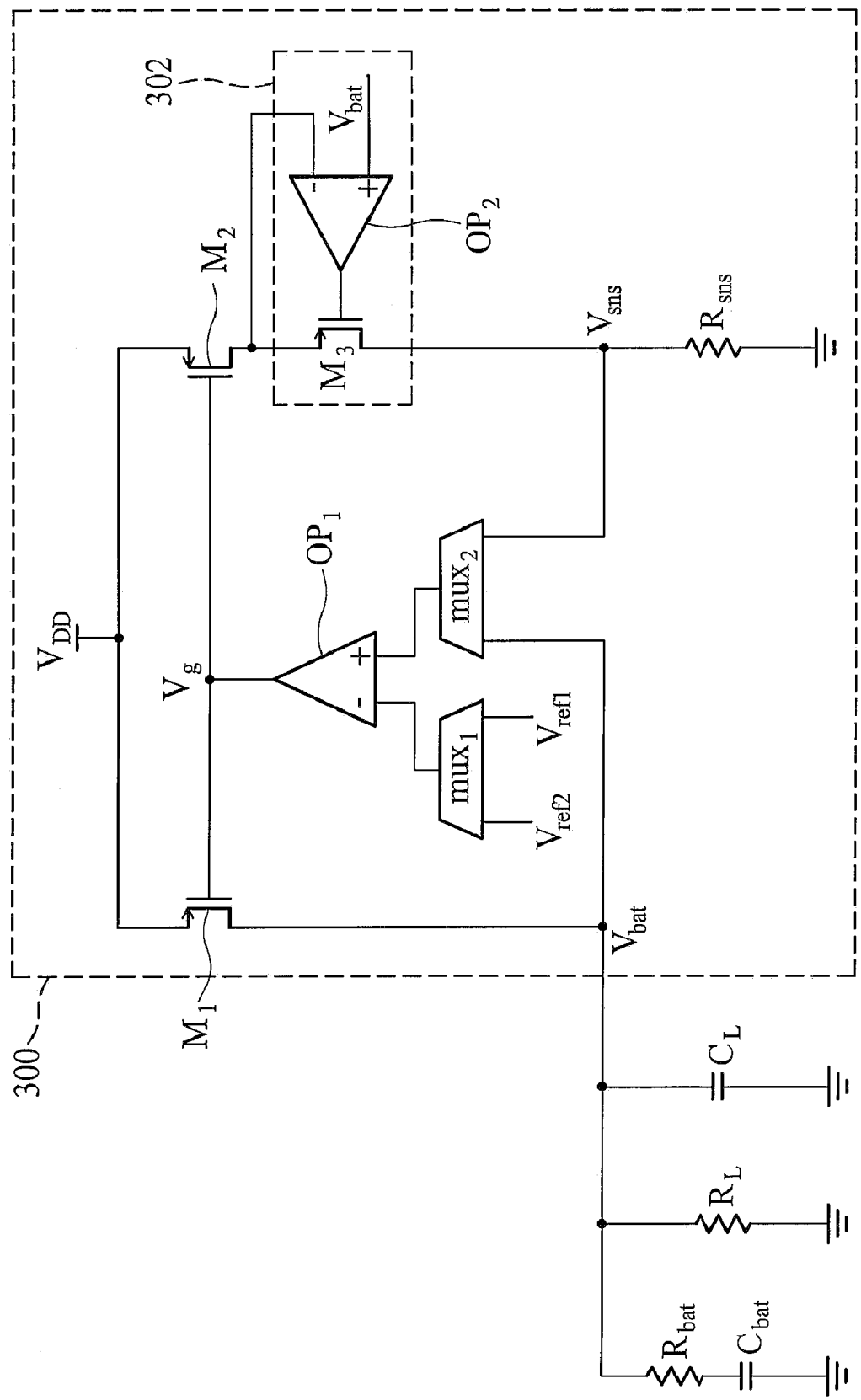
FIG. 3 illustrates another embodiment of the invention.

FIG. 3 is another embodiment of the invention. Compared to the linear battery charger 200, the linear battery charger 300 further comprises a voltage level control circuit 302 coupled between the drain of the second MOS transistor $M_2$ and the current-sensing resistor $R_{sns}$, and comprising a third MOS transistor $M_3$ and a second operational amplifier $OP_2$. The source and drain of the third MOS transistor $M_3$ couple to the drain of the second MOS transistor $M_2$ and the current-sensing resistor $R_{sns}$, respectively. The gate of the third MOS transistor $M_3$ is controlled by the output terminal of the second operational amplifier $OP_2$. The non-inverting and inverting input terminals of the second operational amplifier $OP_2$ are coupled to the drains of the first and second MOS transistors $M_1$ and $M_2$, respectively. The voltage level control circuit 302 equalizes the voltage level of the drain of the second MOS transistor $M_2$ to the voltage level of the drain of the first MOS transistor $M_1$ to maintain the ratio of the first current $I_1$ to the second current $I_2$.

Figure 4:
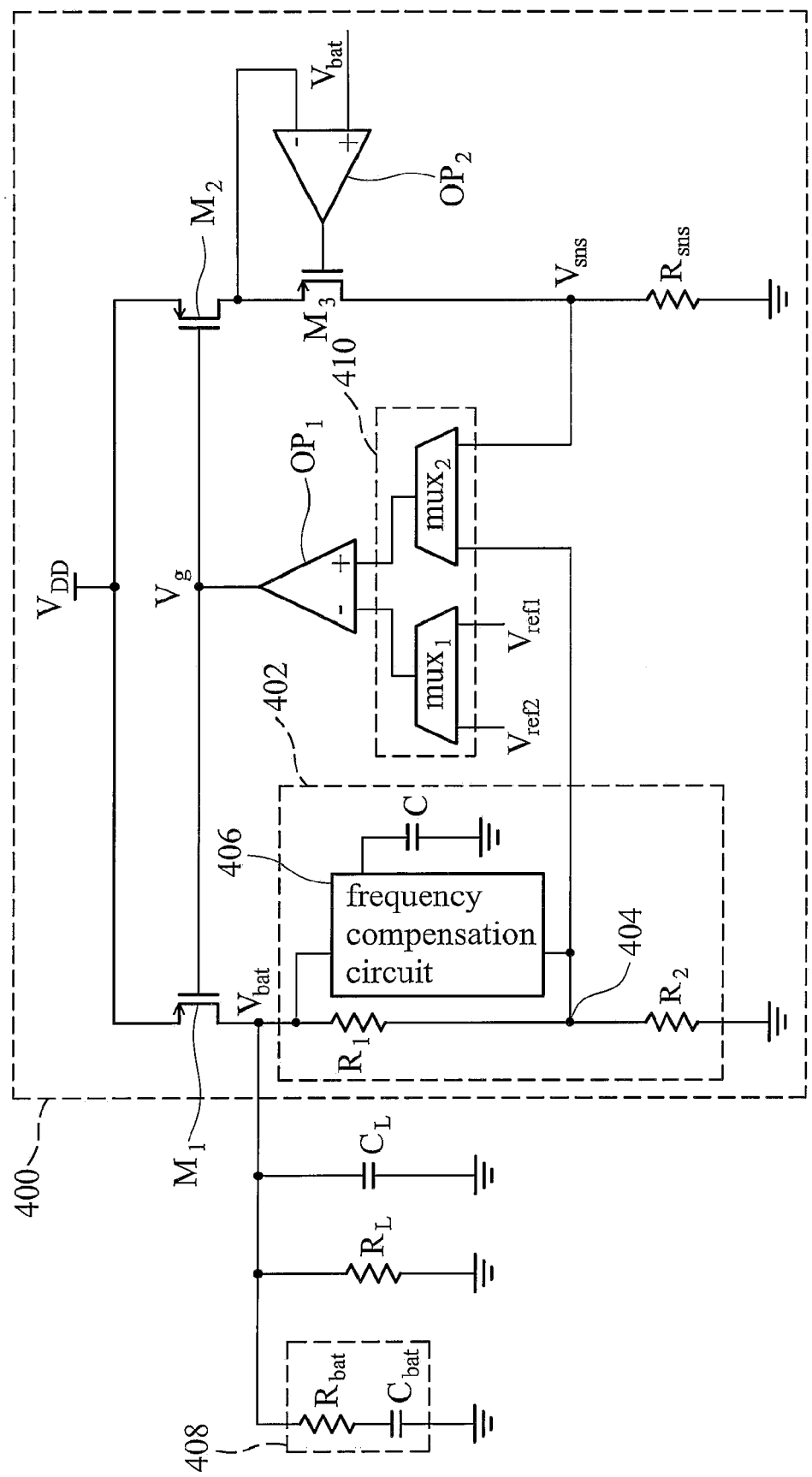
FIG. 4 illustrates another embodiment of the invention.

FIG. 4 illustrates another embodiment of the invention. Compared to the third linear battery charger 300, the linear battery charger 400 further comprises a frequency compensator 402 comprising a plurality of resistors $R_1$ and $R_2$, a voltage dividing terminal 404, a frequency compensation circuit 406, and a variable capacitor C. The resistor $R_1$, the voltage dividing terminal 404, and the resistor $R_2$ are serially coupled between the battery module 408 and a ground terminal. The voltage level of the battery module $V_{bat}$ is divided by the resistors $R_1$ and $R_2$, and output to the multiplexing device 410 via the voltage dividing terminal 404. The frequency compensation circuit 406 couples between the battery module 408 and the voltage dividing terminal 404. The variable capacitor C couples between the frequency compensation circuit 406 and the ground terminal. In the constant voltage charge mode, the frequency compensator 402 provides a zero to eliminate the undesired pole in the control loop. The value of the zero is $1/(R_1 \cdot C)$.

Compared to the frequency compensation capacitors $C_C$ and $C_Z$ in the conventional linear battery charger 100, the variable capacitor C of the frequency compensator 402 has a terminal coupling to the ground terminal. Therefore, the variable capacitor C can be implemented by MOS capacitors, being smaller than the frequency compensation capacitors $C_C$ and $C_Z$ used in the conventional linear battery charger 100.

Figure 5:
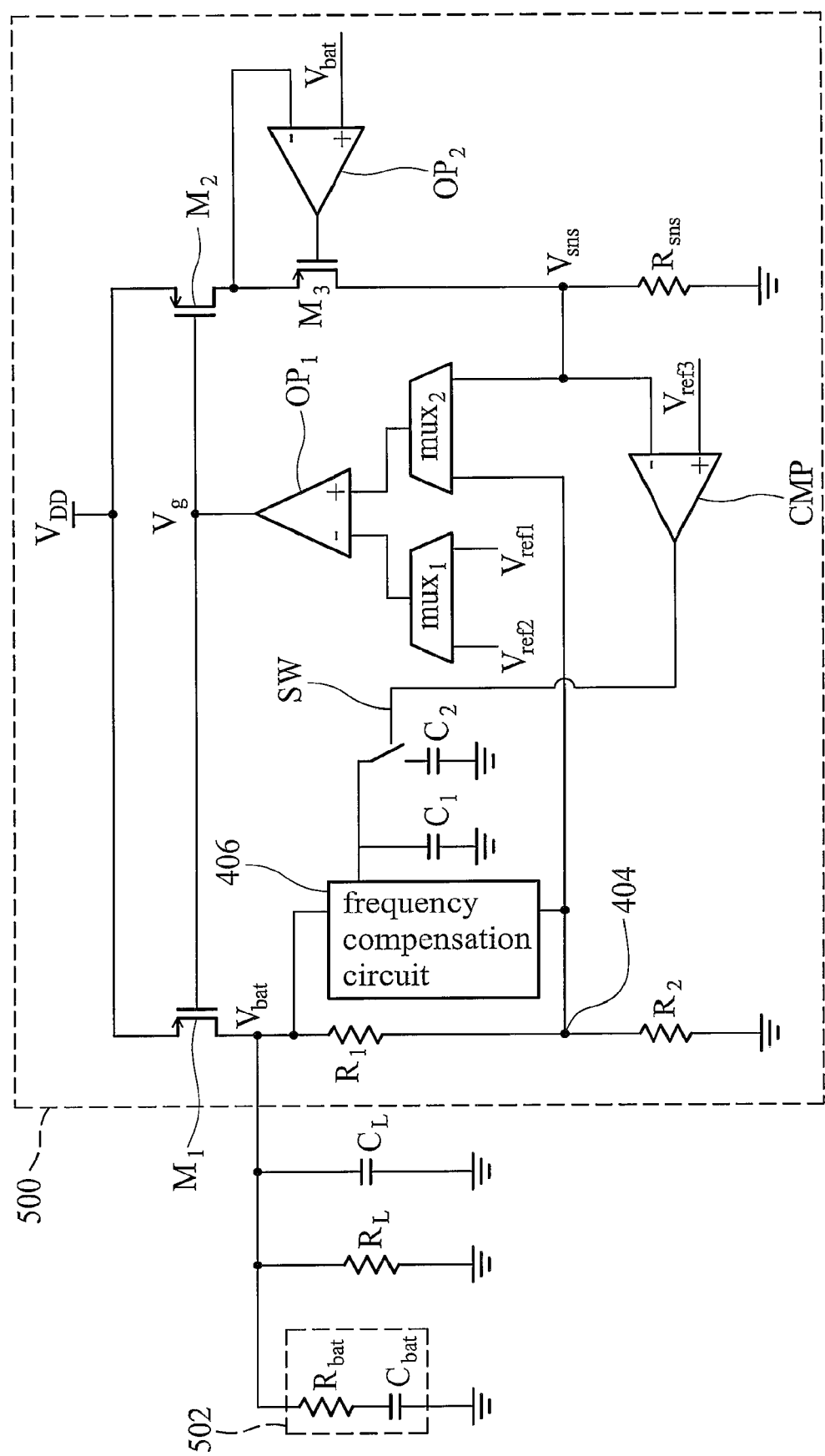
FIG. 5 illustrates another embodiment of the invention.

FIG. 5 illustrates another embodiment of the invention. The difference between the linear battery chargers 400 and 500 is the construction of the variable capacitor. In FIG. 5, the variable capacitor comprises a first capacitor $C_1$, a second capacitor $C_2$, a switch SW corresponding to the second capacitor $C_2$, and a comparator CMP. The comparator CMP has an output terminal coupled to the switch SW to control the switch SW. When the switch SW is turned on, the first and second capacitors $C_1$ and $C_2$ are in parallel. The comparator CMP has a first input terminal and a second input terminal coupled to a third reference voltage $V_{ref3}$ and the detected voltage $V_{sns}$, respectively. The switch SW is turned on when the linear battery charger 500 has a low load current, and is turned off when the linear battery charger 500 has a high load current.

When the linear battery charger 500 is in the constant voltage charge mode, the undesired pole provided on the node $V_{bat}$ varies with the load. When the load current is low (such as a concurrently used and charging cellular phone, wherein the load resistor $R_L$ is high), the pole is at very low frequency. Therefore, the compensation zero provided by the frequency compensator has to be at very low frequency for large phase margin. When the load current is high, the pole is at high frequency. Therefore, the compensation zero has to be at high frequency for large phase margin. In the linear battery charger 500, the comparator CMP determines the frequency at which the compensation zero is located, and controls the switch SW to choose the value of the compensation zero. As shown in FIG. 5, the third reference voltage $V_{ref3}$ couples to the non-inverting input terminal of the comparator CMP, and the detected voltage $V_{sns}$ couples to the inverting-terminal of the comparator CMP. When the load current is low, the detected voltage $V_{sns}$ is lower than the third reference voltage $V_{ref3}$. In such a case, the comparator CMP turns on the switch SW and the value of the compensation zero is $1/(R_1 \cdot (C_1+C_2))$. When the load current is high, the detected voltage Vsns exceeds the third reference voltage $V_{ref3}$. In such a case, the comparator CMP turns off the switch SW and the value of the compensation zero is $1/(R_1 \cdot C_1)$.

Figure 6:
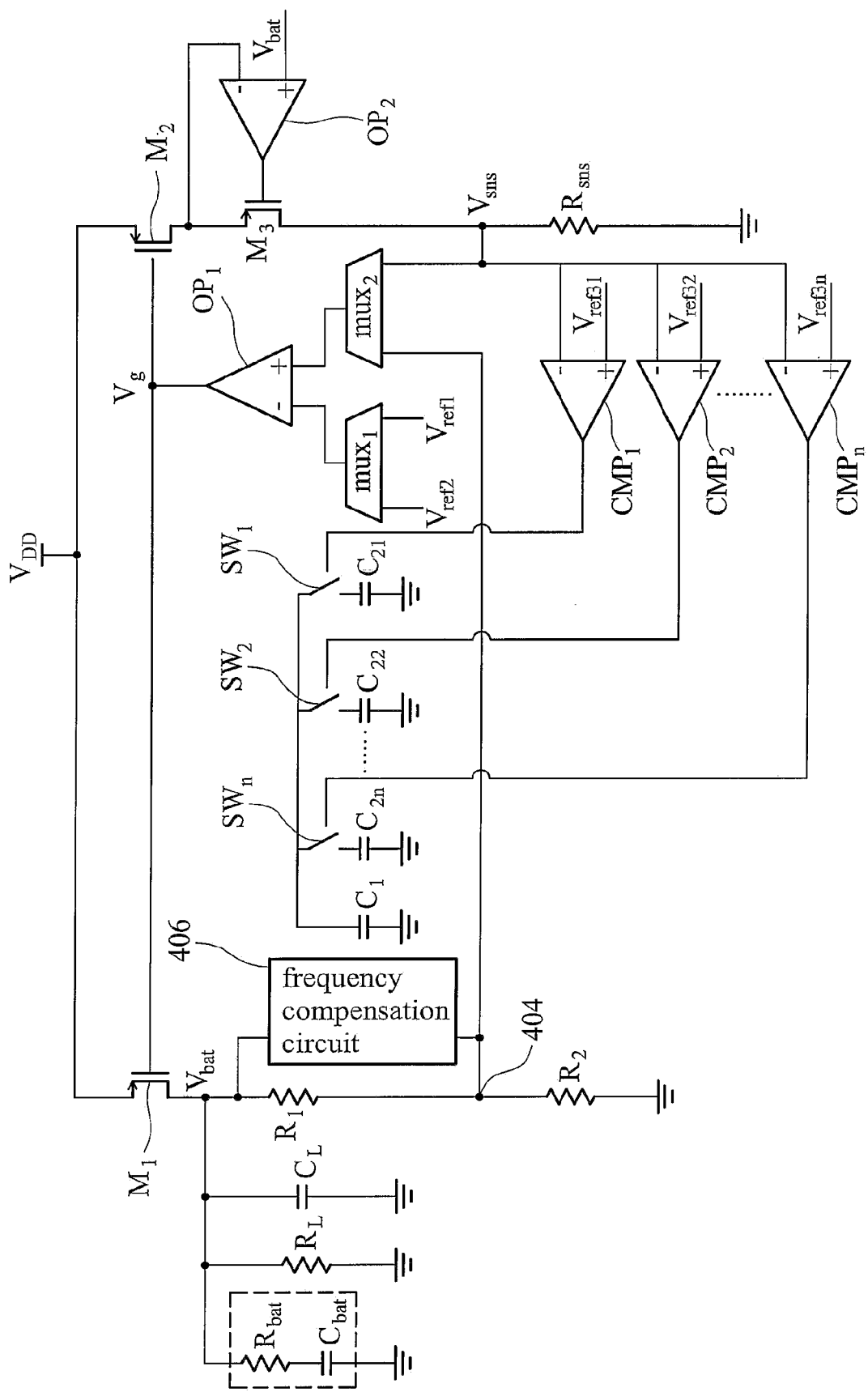
FIG. 6 illustrates another embodiment of the invention.

FIG. 6 shows another embodiment of the invention comprising a modification of the linear battery charger 500 and a plurality of second capacitors ($C_{21}$, $C_{22}$ ..., and $C_{2n}$), a plurality of switches corresponding to the second capacitors ($SW_1$, $SW_2$ ..., and $SW_n$), and a plurality of comparators corresponding to the switches ($CMP_1$, $CMP_2$ ..., and $CMP_n$). The reference voltages $V_{ref31}$, $V_{ref32}$ ..., $V_{ref3n}$ are specially designed for the different levels of the compensation zero. The embodiment shown in FIG. 6 provides a plurality of options of the compensation zero for the linear battery charger.

The technique disclosed in the invention can be further implemented in Low Drop Out regulators (LDO regulators).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A linear battery charger, comprising:
   a current generator, generating a first current and coupled to a battery module;
   a current detector, coupled to the current generator to generate a detected voltage according to the first current;
   a first operational amplifier, comprising a first input terminal, a second input terminal, and an output terminal, wherein the output terminal couples to a control terminal of the current generator; and
   a multiplexing device, respectively coupling a first reference voltage and the detected voltage to the first and second terminals of the first operational amplifier when the linear battery is in a constant current charge mode, and respectively coupling a second reference voltage and a voltage level of the battery module to the first and second input terminals of the first operational amplifier when the linear battery charger is in a constant voltage charge mode.

2. The linear battery charger as claimed in claim 1, wherein the current generator comprises a first metal oxide semiconductor transistor having a drain coupled to the battery module and a gate coupled to the output terminal of the first operational amplifier, wherein the gate of the first metal oxide semiconductor transistor acts as a control terminal of the current generator.

3. The linear battery charger as claimed in claim 2, wherein the current detector comprises a second metal oxide semiconductor transistor and a current-sensing resistor, the second metal oxide semiconductor transistor comprising a drain coupled to the current-sensing resistor and a gate coupled to the gate of the first metal oxide semiconductor transistor and generating a second current proportional to the first current, and the current-sensing resistor transforming the second current to the detected voltage.

4. The linear battery charger as claimed in claim 3 further comprising a voltage level control circuit, coupled between the drain of the second metal oxide semiconductor transistor and the current-sensing resistor, and comprising:
   a third metal oxide semiconductor transistor, comprising a source and a drain coupled to the drain of the second metal oxide semiconductor transistor and the current-sensing resistor, respectively; and
   a second operational amplifier, comprising a first input terminal coupled to the drain of the second metal oxide semiconductor transistor, a second input terminal coupled to the drain of the first metal oxide semiconductor transistor, and an output terminal coupled to a gate of the third metal oxide semiconductor transistor.

5. The linear battery charger as claimed in claim 3 further comprising a frequency compensator, coupled between the battery module and the multiplexing device, and comprising:
   a plurality of resistors and a voltage dividing terminal, serially coupled between the battery module and a ground terminal, wherein the voltage level of the battery module is divided by the resistors, and the divided voltage level of the battery module is transmitted to the multiplexing device via the voltage dividing terminal;
   a frequency compensating circuit, coupled between the battery module and the voltage dividing terminal; and
   a variable capacitor, coupling the frequency compensating circuit to the ground terminal;
   wherein the frequency compensator provides a zero for the linear battery charger in the constant voltage charge mode, and the value of the zero is the inverse of the product of the variable capacitor and the resistors coupled between the battery module and the voltage dividing terminal.

6. The linear battery charger as claimed in claim 5, wherein the variable capacitor comprises:
   a first capacitor;
   a switch and a second capacitor, wherein the second capacitor is coupled parallel to the first capacitor when the switch is turned on; and
   a comparator, controlling the switch, wherein a first input terminal and a second terminal of the comparator are respectively coupled with a third reference voltage and the detected voltage, and the switch is turned on when a load current of the linear battery charger is low and is turned off when the load current of the linear battery charger is high.

7. The linear battery charger as claimed in claim 5, wherein the variable capacitor is implemented by metal oxide semiconductor capacitors.

8. The linear battery charger as claimed in claim 1, wherein the current-sensing resistor is implemented by a variable resistor.

\* \* \* \* \*